Dec. 6, 1927.  
W. W. HAMEL  
1,651,597  
ADVERTISING DEVICE  
Filed May 26, 1925  
5 Sheets-Sheet 1

INVENTOR  
W. William Hamel  
BY  
Marshall & Hawley  
ATTORNEYS.

Dec. 6, 1927. 1,651,597
W. W. HAMEL
ADVERTISING DEVICE
Filed May 26, 1925   5 Sheets-Sheet 4

INVENTOR
W. William Hamel
BY
Marshall & Hawley
ATTORNEYS.

Patented Dec. 6, 1927.

1,651,597

UNITED STATES PATENT OFFICE.

WILLIAM W. HAMEL, OF NEW YORK, N. Y., ASSIGNOR TO ADVERTISING SAMPLERS, INC., OF WILMINGTON, DELAWARE, A CORPORATION OF NEW YORK.

ADVERTISING DEVICE.

Application filed May 26, 1925. Serial No. 32,893.

This invention relates to advertising devices and particularly to devices of this character adapted for use in vehicles, such as taxicabs, busses and so forth.

At the present time there are many thousand taxicabs, busses and similar public conveyances in this country and such vehicles offer an enormous field for placing advertising matter before the public.

As is well known, advertising cards are displayed in public conveyances, such as busses and railway cars, but the number of advertisements that can be so displayed is limited by the space available for that purpose. Furthermore, in vehicles, such as taxicabs, there is not sufficient available space for such advertising display cards.

This invention has for its salient object to provide an advertising device so constructed and arranged that advertisements can be intermittently displayed or displayed one at a time before the passengers in the vehicle whenever the vehicle is in motion and is occupied.

Another object of the invention is to provide an advertising device of the character described having a strip of advertisements thereon and so constructed and arranged that the strip will be fed step by step or intermittently before the passenger and will be automatically reversed when it has been entirely fed from one reel to the other.

Another object of the invention is to provide an advertising device of the character specified so constructed and arranged that the advertising strips or reels can be easily and quickly removed and replaced.

Another object of the invention is to provide a device of the character specified so constructed and arranged that the device will start to operate when a passenger is seated in the vehicle and the vehicle is set in motion but will cease to operate when the passenger leaves the vehicle or the vehicle is vacant.

Further objects of the invention will appear from the following specification taken in connection with the drawings, which form a part of this application, and in which.

The invention briefly described consists of an advertising device including a pair of reels therein adapted to receive a strip of advertising material. This strip may have shown thereon a plurality of advertisements, such as one hundred and twenty-five. The operating shaft for operating the reels is connected to a moving part of the vehicle and may be connected as shown to one of the wheels or to the transmission shaft or any other driving element. The operating shaft is so connected to the reel shaft that the strip is given a step by step or intermittent feed so that each advertisement on the strip will be displayed for a short period of time before the occupant or passengers in the vehicle. Means is also provided for automatically reversing the feed when one of the reels is empty and the other is full. Control means is also provided whereby the device will not operate unless the vehicle is occupied and will start to operate as soon as a passenger is seated and the vehicle starts moving. This control means is so constructed and arranged that when the passenger leaves the vehicle or when the vehicle is vacant, the device will cease to operate. Further details of the invention will appear from the following description.

The advertising device comprises a cabinet having a back wall 20, an upper wall 21 and a bottom 22, a cover having a front wall 23, side walls 24 and a curved lower end 25 of the front wall is mounted to swing downwardly about the axis of the operating shaft 30 as a pivot. A lock 26 is provided for holding the front of the cabinet or cover in closed position, the lock having a slide bar 27 engaging an aperture in a projecting lug 28 formed on the upper wall 21.

*Reel mounting and reel drive.*

A frame 35 is secured at its ends to the side walls 24 of the cover and extends downwardly to form bearings 36 for the opposite ends of the shaft 30.

The frame 35 also has inwardly extending lugs 37 and 38 disposed in alinement with apertured bosses 39 and 40 in which are mounted the hollow reel shafts 41 and 42. Reels or spools 43 and 44 are secured to and are rotatable with the reel shafts, the lower ends of the spools having slots 45 receiving studs 46 carried by the hollow shafts 41 and 42.

The hollow shafts 41 and 42 have extending therethrough spindles 50 and 51 which are rotatably mounted in the hollow shafts and extend through the lugs 37 and 38 at their lower ends.

Collars 52 and 53 are mounted on the spindles 50 and 51 above the lugs.

The shafts 41 and 42 are threaded as shown at 55 at their upper ends and nuts 56 are placed on these threaded portions and secure the reels or spools in position. Each of the spindles 50 and 51 has secured to a squared portion 57 at its upper end an arm, the arms being indicated as 58 and 59.

The purpose of the spindles and arms carried thereby will be hereinafter explained.

The hollow shafts 41 and 42 have secured to their lower ends between the bosses 39 and 40 and the collars 52 and 53, sleeves 60 and 61 having radially projecting therefrom arms or pins 62.

The operating shaft 30 may be driven from any moving part of the vehicle and in the particular form of the invention shown, this shaft has connected to one end thereof a flexible shaft 65, the other end of the shaft having secured thereto a worm 66 which meshes with a worm gear 67 mounted on one of the front wheels of the vehicle.

The shaft 30 has slidably splined thereto a sleeve 70 having flanges 71 and 72 at its ends and has secured thereto sleeves 73 and 74 provided with radially extending pins 75. The sleeves 73 and 74 have formed thereon flanges 76 and each flange is engaged by a spring strip 77 having a pair of depressions 78 and 79 therein. The strips 77 are secured to brackets 80 which in turn are mounted on the back wall 20 of the cabinet and form bearings for the sleeve 70. With the parts in the position shown in Fig. 4, the pins 75 of the sleeve 74 are adapted to engage and rotate the pins 62 of the sleeve 61 on the hollow shaft 42. Thus the spool 44 will be rotated to wind up the strip 81.

*Feed reversing mechanism.*

Means is provided for shifting the sleeve 70 longitudinally on the shaft 70 so as to move the pins 75 of the sleeve 73 into driving relation with reference to the pins 62 of the shaft 41. This means is controlled by the arms 58 and 59. Each of these arms has secured thereto a pair of rods 85 and 86 extending in a direction parallel to the axis of rotation of the reel controlled thereby. The arms 58 and 59 are normally held in the position of the arm 58 in Fig. 2 by means of tension springs 87 which are secured to the arms adjacent the ends thereof and are fixed at their opposite ends as shown at 88.

Idler rollers or guide rollers 89 are mounted on rods 90 extending between the frame member 35 and bars 91 and the bars 91 are carried by rods 92 secured at their ends to the frame member 35 and to the bars 91. Rods 93 also extend between the bars 91 and the frame member 35 and have mounted thereon sleeves 94. Arms 95 are secured to each of the sleeves 94 and these arms carry at their opposite ends, rollers 96 which are pressed into engagement with the reels of paper by means of spring strips 97 secured to the arms and engaging the back wall 20 of the cabinet.

Stop pins 98 mounted on the bars 94 limit the movement of the arms 58 and 59 by the tension springs 87.

Figures 6, 8:
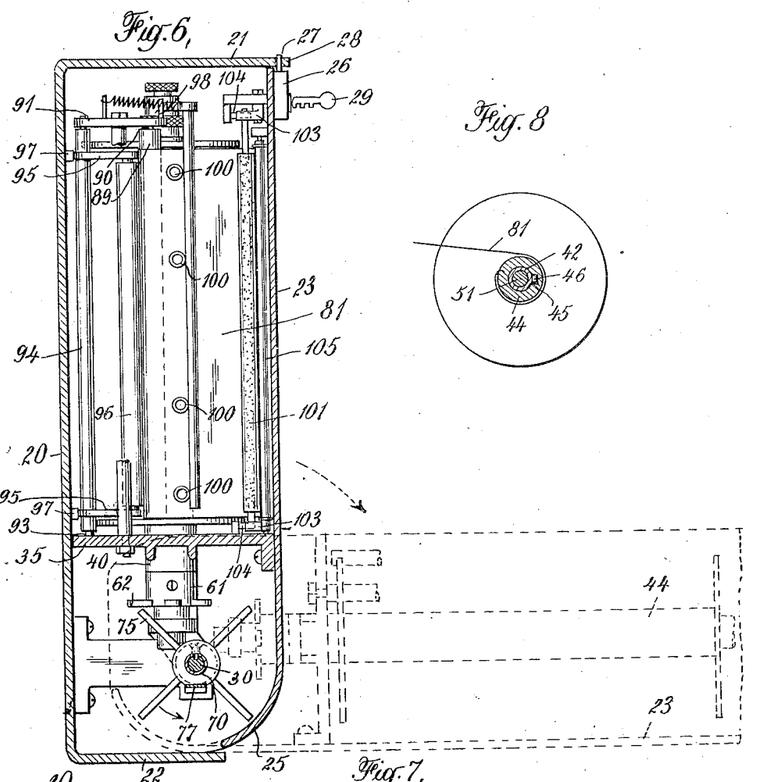
Fig. 6 is a sectional elevation taken substantially on line 6—6 of Fig. 4.
Fig. 8 is a sectional elevation of one of the reels taken substantially on line 8—8 of Fig. 4.
Figure 7:
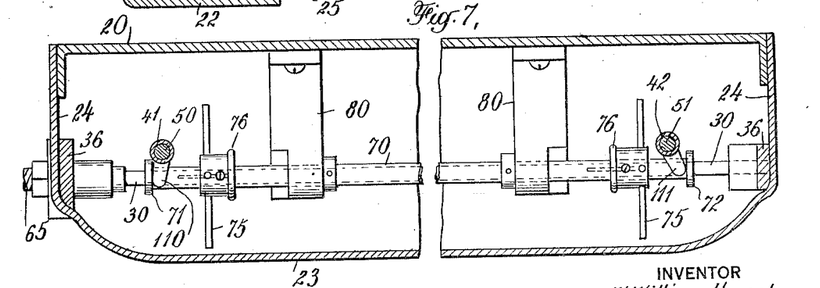
Fig. 7 is a sectional elevation taken substantially on line 7—7 of Fig. 4.
Figure 9:
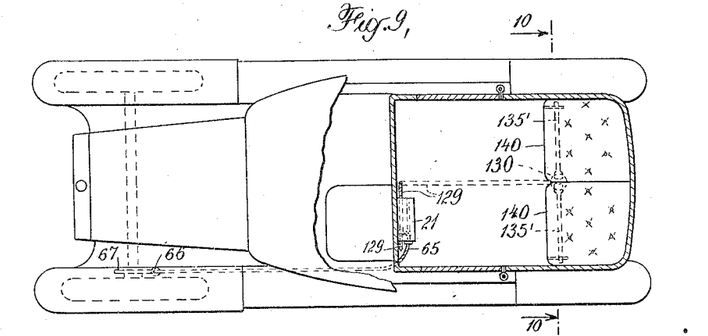
Fig. 9 is a top plan view partly in section of a taxicab showing the location of the advertising device and the mechanism controlled by the seats for placing the device in operation.
Figure 10:
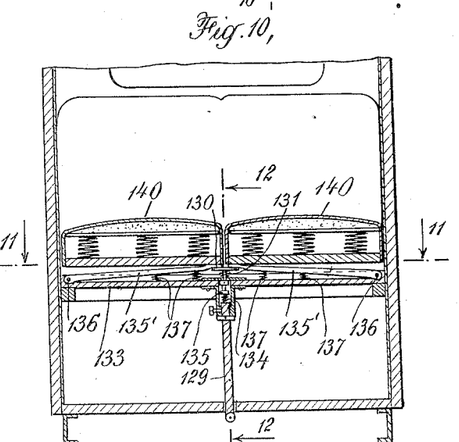
Fig. 10 is a sectional elevation taken substantially on line 10—10 of Fig. 9.
Figure 11:
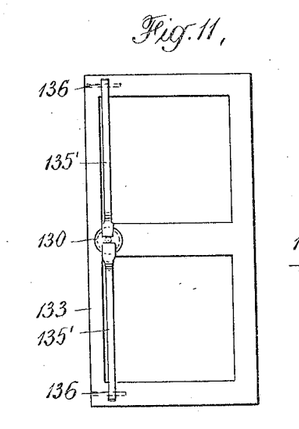
Fig. 11 is a plan view taken substantially on line 11—11 of Fig. 10.
Figure 12:
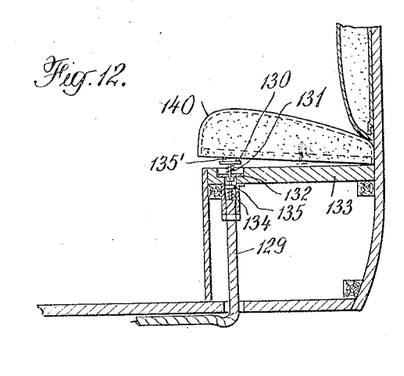
Fig. 12 is a sectional elevation taken substantially on line 12—12 of Fig. 10.
Figure 13:
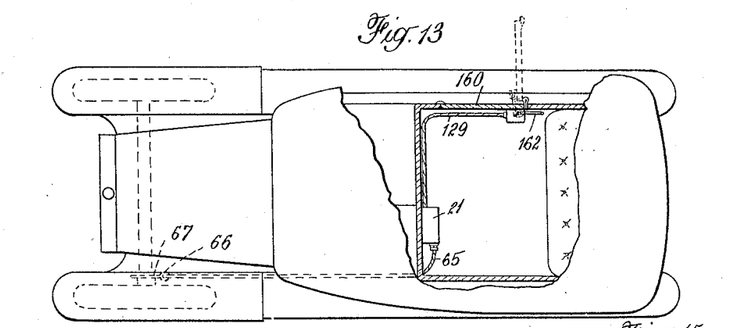
Fig. 13 is a view similar to Fig. 9, but showing the door operated mechanism for controlling the operation of the device.

The strip 81 of advertising material has secured thereto adjacent the two ends thereof a series of buttons or eyelets 100, these members extending across the width of the strips as illustrated in Fig. 6 and the rods 85 and 86 are disposed close enough together so that the eyelets or buttons cannot pass between them with the strip.

Spring tension rollers 101 and 102 are carried by pivoted arms 103 and are resiliently actuated by springs 104 engaging the arms 103. Cross rods 105 limit the movement of the rollers by the springs.

It will be noted that the rollers 101 and 102 and the cross rods 105 are disposed at opposite sides of an opening 106 in the front cover of the cabinet and maintain the strip in flat position as it passes behind the opening and is observed through the glass window 107 carried by the cover and positioned over the opening.

*Operation of drive and reversing mechanism.*

Figure 4:
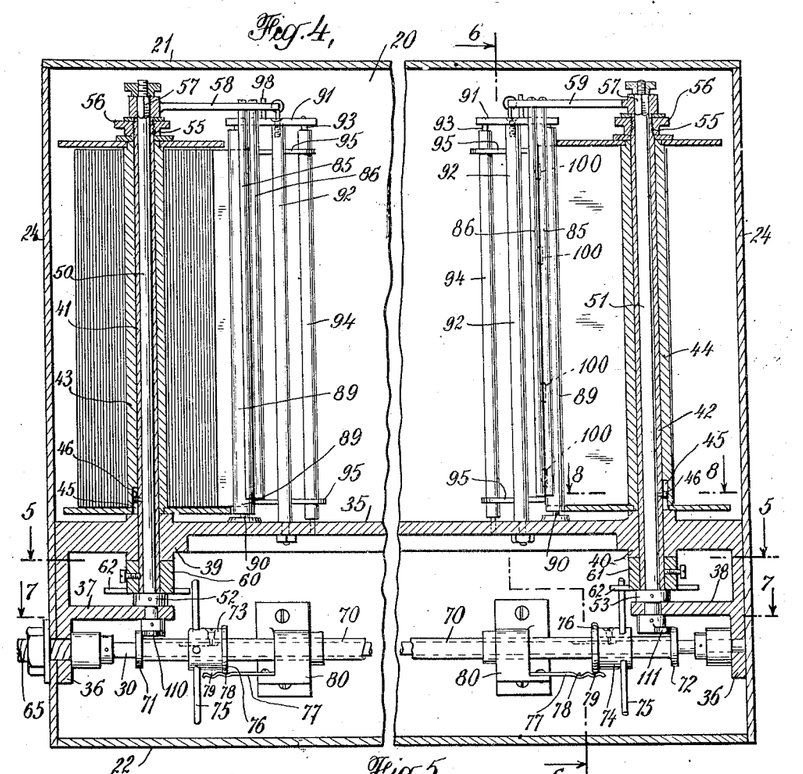
Fig. 4 is a sectional elevation taken substantially on line 4—4 of Fig. 2.
Figure 5:
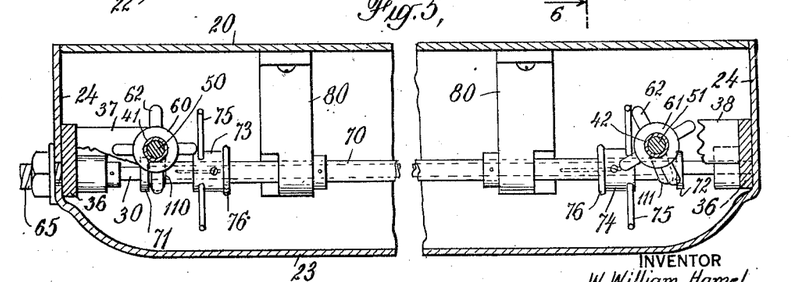
Fig. 5 is a sectional elevation taken substantially on line 5—5 of Fig. 4.

With the parts in the positions illustrated in Fig. 4, the pins 75 carried by the sleeve 74 are disposed in position to engage the pins 62 carried by the sleeve 61. Therefore, as the shaft 30 is rotated, the hollow shaft or sleeve 70 and sleeve 74 will also be rotated, thus causing the rotation of the sleeve 61 and hollow reel shaft 42. The strip will, therefore, be wound on the reel 44 and be withdrawn from the reel 43.

When the reel is empty, the eyelets or buttons 100 carried adjacent the end of the strip secured to the reel 43 will engage the rods 85 and 86 carried by the arm 58. This will cause the rotation of the spindle 50 which in turn will cause a lug 110 secured to the lower end of the spindle to engage the flange 71 by the left hand end of the sleeve 70 and by reason of this engagement, to move the sleeve 70 to the left, thus at the same time moving the pins 75 of the sleeve 74 out of cooperative relation with the pins 62 of the sleeve 61. At the same time, the pins 75 of the sleeve 73 will be moved into operative relation with respect to the pins 62 of the sleeve 60. The spring strips 77 will retain the sleeves 73 and 74 in both positions of adjustment.

Figure 1:
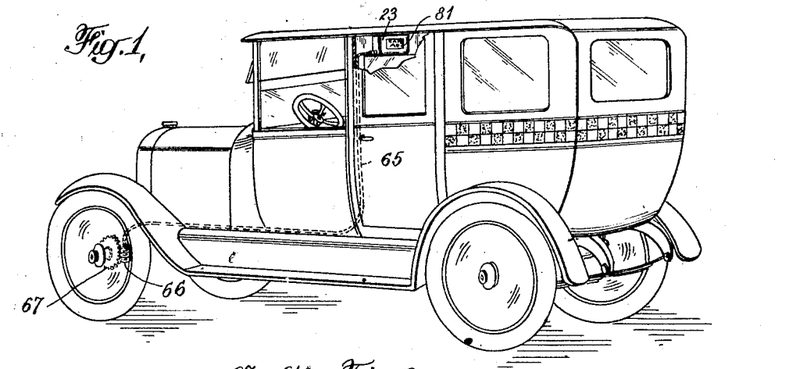
Fig. 1 is a perspective view of a taxicab having mounted therein an advertising device constructed in accordance with the invention.
Figure 2:
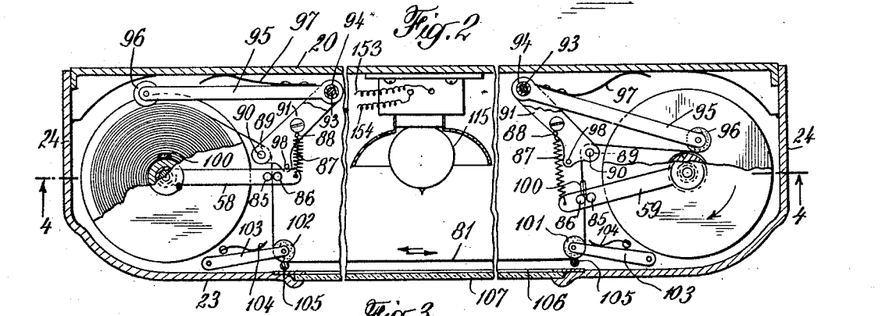
Fig. 2 is a sectional elevation through the cabinet of the advertising device illustrating the reels and strip control mechanism.
Figure 3:
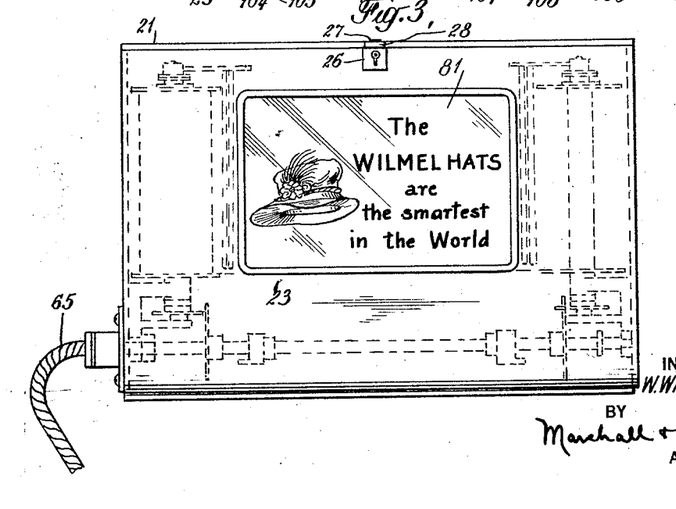
Fig. 3 is a front elevation of the cabinet having mounted therein an advertising device constructed in accordance with the invention.

As soon as the strip has been unwound from the reel 44, the buttons 100 carried by the strip adjacent that end thereof will engage the rods 85 and 86 as shown in Fig. 2, thus causing the spindle 51 and lug 111 secured to the lower end of the spindle 51 to move the sleeve 70 to the right to the position shown in Fig. 4.

Thus it will be seen that the reels will be alternately driven, the feeding of the web being automatically reversed when the web has been unwound from one reel and wound up on the other.

*Automatic control for drive shaft and lamp.*

A lamp 115 is mounted in the cabinet behind the strip 81 for the purpose of illuminating the strip which is preferably translucent. It will be evident that it will be unnecessary and would involve needless expense to have the lamp 115 lighted and have the advertising strip in operation when the vehicle is unoccupied by passengers. For this reason, control means has been designed so constructed and arranged that the lamp will be lighted and the strip will be operated when the cab is occupied but when the cab is vacant, the lamp circuit will be open and the strip feed will be disconnected from the drive shaft.

*Clutch and lamp control mechanism.*

Figure 18:
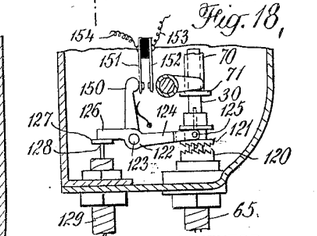
Fig. 18 is an elevational view showing the connections between the seat control mechanism and clutch and lamp controlling devices.

In the form of the invention illustrated in Figs. 9 to 12 and 18, this mechanism is controlled by the vehicle seats. As shown in Fig. 18, the flexible shaft 65 has secured thereto a clutch member 120 adapted to be engaged by a coacting clutch member 121 slidably mounted on the shaft 30. A lever 122 is mounted on a fixed pivot 123 and has an arm 124 provided with a bifurcated end 125 engaging the clutch member 121. The lever 122 also has an oppositely extending arm 126 positioned to be engaged by one end 127 of a flexible shaft 128. The shaft 128 extends through a flexible sheath 129 and has secured to its opposite end a button or plate 130.

The plate 130 and shaft carried thereby are forced upwardly (see Figs. 10 and 12) by a spring 131 which at one end engages the plate 130 and at its opposite end engages an abutment 132 positioned in a recess formed in the seat frame 133. The shaft is also forced upwardly by means of a spring 134 which engages a collar 135 secured to the shaft. A stop collar 136 carried by the shaft limits the upward movement thereof, this collar being disposed below the abutment. An arm 135 is pivoted on each side of the frame 133 as shown at 136 and has its inner end disposed above and resting upon the plate or button 130. Springs 137 are mounted between the frame 133 and the arms 135 and normally forces these arms upwardly. Seats 140 are mounted on the seat frame 133 and rest at their forward ends on the upper ends of the pivoted arms 135'. The springs 137 beneath the pivoted arms are of such strength that the seats 140 will be maintained as shown in the position illustrated in Fig. 12 unless the passenger seats himself thereon.

The lever 124 also has an arm 150 extending upwardly therefrom and positioned to engage a switch comprising contact members 151 and 152 and to force these members into contact with each other, thus closing the lamp circuit which includes wires 153 and 154 which are connected to the switch contacts.

*Operation of seat controlled mechanism.*

When a passenger seats himself on one of the seats 140, the arm 135 beneath the seat will force downwardly the button or plate 130 and force longitudinally through its sheath or casing, the shaft 128. The shaft in turn will swing the lever 122 about its pivot 123 closing the clutch 120, 121 and closing the lamp switch 151, 152. Thereupon, the lamp will be lighted and when the vehicle is operated, the strip will be fed.

*Description of control mechanism shown in Figs. 13 to 17 inclusive.*

In the control mechanism illustrated in Figs. 13 to 17 inclusive, the clutch for the drive shaft and the switch for the lamp are controlled by the opening of the door of the taxicab. In this construction the same lever 122, lever clutch arm 124, arm 126 and switch constrol arm 150 are utilized as explained in connection with the control mechanism illustrated in Figs. 9 to 12 and 18.

The control mechanism is shown as operable by one of the doors 160 but it should be understood that the same control mechanism can be applied, if desired, to both of the rear doors of the vehicle. The door 160 is shown as hinged at 161 and is adapted to swing outwardly in the usual manner. A lever 162 is pivoted at 163 to the door and is spring-pressed in an anti-clockwise direction by a spring 164. The lever 162 has an offset end 165 disposed in the path of teeth 166 carried by a toothed wheel 167 mounted on shaft 168. The shaft 168 also has mounted thereon a cam 169 having extensions 170 and 171 and depressed portions 172 and 173, the extensions and depressions alternating around the axis of the cam. A spring 175 engages the toothed wheel 167 and retains this wheel in its adjusted positions.

Figure 14:
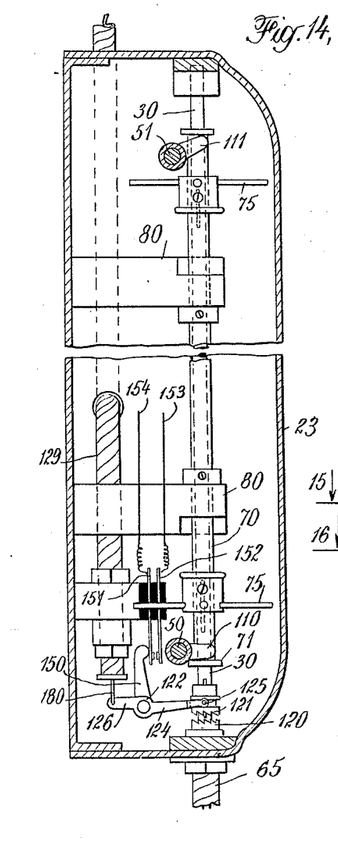
Fig. 14 is a sectional elevation showing the clutch and lamp controlling means.
Figures 15, 16:
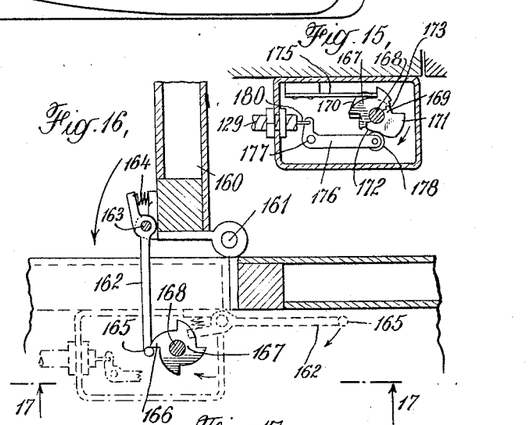
Fig. 15 is a sectional elevation taken substantially on line 15—15 of Fig. 17.
Fig. 16 is a sectional elevation taken substantially on line 16—16 of Fig. 17.
Figure 17:
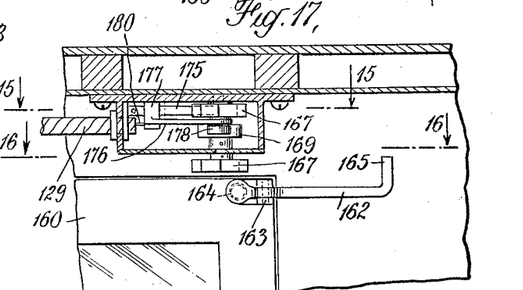
Fig. 17 is a sectional elevation taken substantially on line 17—17 of Fig. 16.

A bell crank lever 176 is mounted on the fixed pivot 177 and carries at one end a roller 178 positioned in the path of the cam 169. The other end of the bell crank lever is connected to a flexible shaft 180 which as shown in Fig. 14 is connected to the arm 126 of the lever 122.

*Operation of structure shown in Figs. 13 to 17 inclusive.*

Since there are four teeth on the toothed wheel 167 and two projecting portions and two depressed portions on the cam 169, it will be evident that when the toothed wheel is rotated, the roller 178 will be positioned alternately on one of the projecting portions 170 and 171 and one of the depressed portions 172 and 173. The toothed wheel is rotated by means of the engagement of the offset end 165 of the roller 162 with a tooth of the wheel and every time the door is opened, the wheel will be rotated one tooth. The shaft 168 will be so adjusted initially that the first opening of the door 160 to admit a passenger will cause the roller 178 to ride onto the elevated or projecting portion 170 or 171 of the cam 169. This will cause a pull on the shaft 180, thus swinging the lever 122 in a clockwise direction, throwing in the clutch 120, 121 and closing the lamp switch 151, 152.

The advertising device will then operate until the door 160 is again opened to permit a passenger to leave whereupon the toothed wheel 167 will be rotated another tooth, thus positioning the roller 178 in one of the depressions on the cam 169, causing the shaft 180 to move in the opposite direction, thereby throwing out the clutch and opening the lamp switch.

It will be evident that control mechanism like that just described can be installed for both of the doors if this seems desirable.

From the foregoing specification it will be evident that simple, practical and effective means has been designed for displaying advertising material in a vehicle and that by the means described, the device will be operative only when the vehicle is occupied and will be automatically reversed when one of the reels has been emptied and the other has been filled.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. In combination, a vehicle, a driving element thereon, seats in said vehicle, an advertising device comprising a strip having a plurality of advertisements thereon, and operative step by step driving connections between said driving elements and said strip, said driving connections including clutch mechanism, means for moving said clutch mechanism to inoperative position and means controlled by said seats for moving the clutch mechaninsm to operative position.

2. In combination, a vehicle having seats, a driving element on the vehicle, an advertising device comprising a pair of reels, a strip secured thereto and a lamp intermediate the reels and behind the strip, a switch for the lamp, a drive shaft, operative connections including a clutch between said shaft and said driving element. operative driving connections between said shaft for driving said reels, and means controlled by said seats for closing said clutch and said lamp switch.

3. In combination, a vehicle having seats, a driving element on the vehicle, an advertising device comprising a pair of reels, a strip secured thereto and a lamp intermediate the reels and behind the strip, a switch for the lamp, a drive shaft, operative connections including a clutch between said shaft and said driving element, selective means carried by said shaft for driving either of said reels, and means controlled by said seats for closing said clutch and said lamp switch.

4. In combination, a vehicle having seats, a driving element on the vehicle, an advertising device comprising a pair of reels, a strip secured thereto and a lamp intermediate the reels and behind the strip, a switch for the lamp, a drive shaft, operative connections including a clutch between said shaft and said driving element, selective means carried by said shaft for driving either of said reels, means controlled by said seats for closing said clutch and said lamp switch, and automatically operable mechanism including control means carried by the strip for changing the drive from one reel to the other reel.

5. An advertising device comprising a pair of reels adapted to feed a strip of advertising material, reel shafts, a drive shaft, a driven shaft operatively connected thereto, gearing elements on said driven shaft, a gear element on each reel shaft, and means controlled by the strip for alternately shifting the driven shaft gear elements into operative engagement with the reel shaft gear elements.

6. An advertising device comprising a pair of reels adapted to feed a strip of advertising material, reel shafts, a drive shaft, a driven shaft operatively connected thereto, gearing elements on said driven shaft, a gear element on each reel shaft, and means controlled by the strip for alternately shifting the driven shaft gear elements into operative engagement with the reel shaft gear elements, said gear elements being constructed and arranged to impart a step by step feed to the strip.

7. An advertising device comprising a pair of reels adapted to feed a strip of advertising material, reel shafts, a drive shaft, a driven shaft operatively connected thereto, gearing elements on said driven shaft, a gear element on each reel shaft, means controlled by the strip for alternately shifting the driven shaft gear elements into operative engagement with the reel shaft gear elements, and means for holding the driven shaft gear elements in adjusted position.

8. An advertising device comprising a pair of reels adapted to feed a strip of advertising material, reel shafts, a drive shaft, a driven shaft operatively connected thereto, gearing elements on said driven shaft, a gear element on each reel shaft, means controlled by the strip for alternately shifting the driven shaft gear elements into operative engagement with the reel shaft gear elements, and yieldable means for holding the driven shaft gear elements in adjusted position.

9. In combination, a vehicle having seats, a driving element on the vehicle, an advertising device comprising a pair of reels, a strip secured thereto and a lamp intermediate the reels and behind the strip, a switch for the lamp, a drive shaft, operative connections including a clutch between said shaft and said driving element, selective means carried by said shaft for driving either of said reels, means controlled by said seats for closing said clutch and said lamp switch, and automatically operable mechanism including control means carried by the strip and means extending across the strip for changing the drive from one reel to the other reel.

10. In combination, a vehicle having seats, a driving element on the vehicle, an advertising device comprising a pair of reels, a strip secured thereto and a lamp intermediate the reels and behind the strip, a switch for the lamp, a drive shaft, operative connections including a clutch between said shaft and said driving element, selective means carried by said shaft for driving either of said reels, means controlled by said seats for closing said clutch and said lamp switch, and automatically operable mechanism including means carried by and adjacent each end of the strip and means adjacent each reel for changing the drive from one reel to the other.

11. In combination, a vehicle having seats, a driving element on the vehicle, an advertising device comprising a pair of reels, a strip secured thereto and a lamp intermediate the reels and behind the strip, a switch for the lamp, a drive shaft, operative connections including a clutch between said shaft and said driving element, means carried by said shaft for driving said reels intermittently, and means disposed beneath and operable by said seats for closing said clutch and said lamp switch.

12. In combination, a vehicle having seats, a driving element on the vehicle, an advertising device comprising a pair of reels, a strip secured thereto and a lamp intermediate the reels and behind the strip, a switch for the lamp, a drive shaft, operative connections including a clutch between said shaft and said driving element, means carried by said shaft for driving said reels intermittently, and normally inoperative means disposed beneath the seats controlling said clutch and switch, said means being operable when a seat is occupied to throw in the clutch and close the switch.

13. In combination, a vehicle having seats, a driving element on the vehicle, an advertising device comprising a pair of reels, a strip secured thereto and a lamp intermediate the reels and behind the strip, a switch for the lamp, a drive shaft, operative connections including a clutch between said shaft and said driving element, means carried by said shaft for driving said reels intermittently, and means operable by a passenger for simultaneously throwing in the clutch and closing the switch.

14. In combination, a vehicle having a seat, a driving element on the vehicle, an advertising device comprising a pair of reels and a strip thereon, a shaft, operative connections including a clutch between said shaft and said driving element, said shaft being movable into driving relation with either of said reels, means for shifting said shaft into driving connection with one reel when the strip has been substantially unwound from said reel and wound upon the other reel, and means controlled by said seat for operating said clutch.

In witness whereof, I have hereunto set my hand this 25th day of May, 1925.

WILLIAM W. HAMEL.